United States Patent Office 2,822,381
Patented Feb. 4, 1958

2,822,381

3-OXYGENATED 16-HYDROXY-D-HOMOPREG-NEN-20-ONES AND THEIR ESTERS

Raymond M. Dodson, Park Ridge, and Paul B. Sollman, Evanston, Ill., assignors, by mesne assignments, to G. D. Searle & Co., Skokie, Ill., a corporation of Delaware No Drawing. Application November 24, 1954
Serial No. 471,118

10 Claims. (Cl. 260—488)

The present invention relates to a new group of chrysene derivatives and, more specifically, to 3-oxygenated 16-hydroxy-D-homopregnen-20-ones and their esters.

The compounds which constitute this invention can be represented by the general structural formula

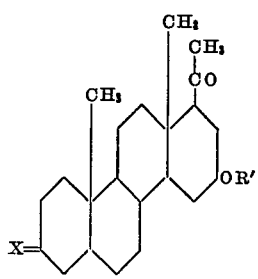

wherein one of the bonds linking the carbon atom in position 5 to the carbon atoms in positions 4 and 6 is unsaturated, wherein R' is a member of the class consisting of hydrogen and acyl radicals derived from hydrocarbon carboxylic acids containing preferably no more than 8 carbon atoms, and wherein X= is a member of the class consisting of oxo,

and

radicals, R being defined as R'. The acyl radicals which R and R' can represent are derived from such hydrocarbon carboxylic acids as formic, acetic, propionic, butyric, pentanoic, hexanoic, benzoic, toluic, cyclohexanecarboxylic, cyclohexaneacetic, cyclopentanepropionic acid and the like.

The compounds of this invention can be synthesized by a method described in the copending application of R. M. Dodson, Serial No. 362,955, filed June 19, 1953, which issued as U. S. Patent No. 2,697,109 on December 14, 1954. The present application is a continuation-in-part of the said copending application. The reaction can be illustrated graphically as follows, showing only ring D and the substituents thereon:

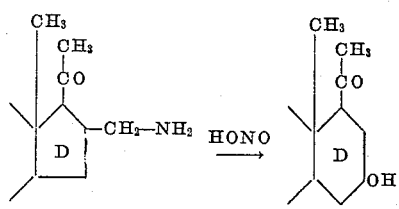

Both the 16α- and 16β-hydroxy isomers are formed. By-products in this reaction are the 16-hydroxymethyl-pregnenes of the type

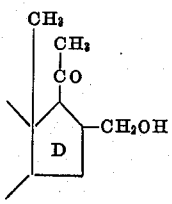

17-dehydro-D-homopregnenes of the type

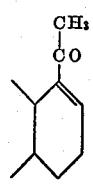

and 16-methyl-16-pregnenes of the type

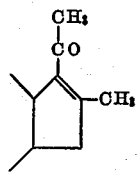

The 16-aminomethylpregnenes which serve as starting materials in this process are described in detail in the copending application of R. M. Dodson, Serial No. 449,789, filed August 13, 1954, issued as Patent No. 2,727,908, and Serial No. 458,252, filed September 24, 1954.

The compounds of this invention have valuable pharmacological properties. In particular, they offer potent hypotensive agents and antiinflammatory agents. They have a cortisone-like action in such allergic conditions as iritis.

The compounds which constitute this invention and the methods for their preparation will appear more fully from the consideration of the following examples. However, the invention is not to be construed as limited by the details set forth in spirit or in scope. In these examples temperatures are indicated in degrees Centigrade and quantities of materials in parts by weight. Optical rotations are determined at 25° C.

*Example 1*

97 parts of 3β-acetoxy-16-aminomethyl-5-pregnen-20-one are dissolved in a solution of 15.7 parts of acetic acid in 1000 parts of water, treated with a solution of 18 parts of sodium nitrite in 2200 parts of water and heated on the steam bath for 2 hours. The precipitate is collected on a filter, washed thoroughly with water and then dried. A small amount of additional material is obtained by heating the filtrate an additional 4 hours.

The neutral products are hydrolyzed by heating for one hour at reflux temperature with 50 parts of potassium hydroxide in 250 parts of water and 1000 parts of methanol. The resulting solution is diluted with water, neutralized with acetic acid and then filtered. The residue is dissolved in a large volume of a 20% solution of ethyl acetate in benzene and applied to a chromatography column containing 6800 parts of silica gel. The unabsorbed material and that eluted with 20% ethyl acetate in benzene is chromatographed on a second column containing 2600 parts of silica gel. Elution of the second column with a 5% solution of ethyl acetate in benzene, concentration of the eluate and crystallization of the residue from dilute acetone and then from benzene yields 3-hydroxy-D-homo-5,17-pregnadien-20-one, melting at about 231–233° C. The ultraviolet absorption spectrum shows a maximum at 233 millimicrons with a molecular extinction coefficient of 8930. Further elution of the column with a 5% solution of ethyl acetate in benzene yields a compound $C_{22}H_{32}O_2$; the ultraviolet absorption spectrum shows a maximum at 251 millimicrons with an extinction coefficient of 6900. This compound is probably impure 3-hydroxy-16-methyl-5,16-pregnadien-20-one.

The first column is washed with 80,000 parts of a 20% solution of ethyl acetate in benzene and then eluted with 60,000 parts of a 40% solution of ethyl acetate in benzene. Concentration of this eluate and crystallization of the residue from dilute dioxane and then from a mixture of benzene and alcohol yields a compound melting at about 273–274.5° C. It shows no appreciable absorption in the ultraviolet spectrum between 220 and 300 millimicrons. This compound has been identified as 3,16-dihydroxy-D-homo-5-pregnen-20-one of the structural formula

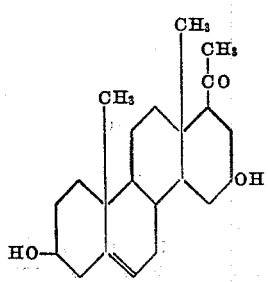

Further elution of the column with 60,000 parts of a 40% solution of ethyl acetate in benzene, concentration of the eluate and successive crystallizations of the residue from dilute acetone, then from a mixture of benzene and ethanol and finally from dilute methanol, and rechromatography on alumina yields crystals melting at about 217–220° C., that have been tentatively identified as 16-hydroxymethyl-5-pregnen-3-ol-20-one.

Elution of the column with a 50% solution of ethyl acetate in benzene and then with a 75% solution of ethyl acetate in benzene, evaporation of the eluates and crystallization from acetone yields two crops, the first of which melts at about 192–202° C. and the second of which melts at about 206–209° C. The second crop is crystallized once from dilute methanol and three times from a mixture of benzene and ethanol. The resulting product melts at about 216–217° C. The specific rotation of a 1% chloroform solution is $[\alpha]_D = -20°$. This product is presumably one of the isomers of 3,16-dihydroxy-D-homo-5-pregnen-20-one. A mixture with the isomeric compound above, M. P. 217–220° C., melts at about 200–210° C.

Example 2

A solution of 97 parts of 3-acetoxy-16-aminomethyl-5-pregnen-20-one and 15.7 parts of acetic acid in 1000 parts of water is treated with a solution of 18 parts of sodium nitrite in 2200 parts of water and heated on the steam bath for 2 hours. The precipitate is collected on a filter, washed thoroughly with water and then dried. A small amount of additional material is obtained by further heating of the filtrate for 4 hours.

The neutral products are hydrolyzed by heating for one hour at reflux temperature with 36 parts of sodium hydroxide in 250 parts of water and 1000 parts of methanol. The resulting solution is diluted with water, neutralized with acetic acid and then filtered. The residue is dissolved in a mixture of 980 parts of pyridine and 810 parts of acetic anhydride. After 16 hours of standing at room temperature, 100 parts of solvent are distilled off under reduced pressure and the residue is poured onto 400 parts of ice. The precipitate is collected on a filter, washed with water and dried in an oven. It is then dissolved in benzene and applied to a chromatography column containing 6500 parts of silica gel. Elution with a 2% solution of ethyl acetate in benzene, concentration of the eluate and crystallization of the residue from a mixture of ethyl acetate and petroleum ether yields 3-acetoxy-D-homo-5,17-pregnadien-20-one which melts at about 180–181° C. The specific rotation of a 1% chloroform solution is $\alpha_D = +20.5°$. An ultraviolet absorption maximum at 233 millimicrons has a molecular extinction coefficient of about 9,250. Further elution of the column with a 5% solution of ethyl acetate in benzene yields 3-acetoxy-16-methyl-5,16-pregnadien-20-one, melting at about 175–176° C. The ultraviolet absorption spectrum shows a maximum at 251 millimicrons with a molecular extinction coefficient of about 9,360. An 0.5% ethanol solution shows a specific rotation of $\alpha_D = -73°$.

Further elution of the column with a 7% solution of ethyl acetate in benzene yields 3,16-diacetoxy-D-homo-5-pregnen-20-one which melts at about 212–214° C. The specific rotation of an 0.5% chloroform solution is $\alpha_D = -44°$.

Further elution of the column with a 7% solution of ethyl acetate in benzene yields a substance melting at about 134–136° C.

Example 3

A solution of 10 parts of 3,16-dihydroxy-D-homo-5-pregnen-20-one in 200 parts of pyridine and 200 parts of acetic anhydride is permitted to stand at room temperature for 16 hours and then poured into ice water. The precipitate is collected on a filter, washed with water and recrystallized from ethanol to yield 3,16-diacetoxy-D-homo-5-pregnen-20-one melting at about 212–214° C. The compound has the structural formula

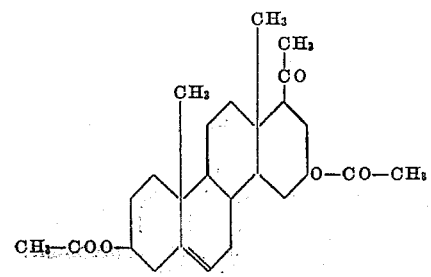

Example 4

97 parts of 3-acetoxy-16-aminomethyl-5-pregnen-20-one are dissolved in a solution of 15.7 parts of acetic acid in 1000 parts of water, treated with a solution of 18 parts of sodium nitrite in 2200 parts of water and heated on the steam bath for 2 hours. The precipitate is collected on a filter, washed thoroughly with water and dried. The dried precipitate is dissolved in 3500 parts of benzene and applied to a chromatography column containing 4000 parts of silica gel. Elution with 40,000 parts of a 5% solution of ethyl acetate in benzene yields a mixture of olefinic materials. The column is then eluted with 20% ethyl acetate in benzene. The fractions containing solid residues are crystallized from benzene and petroleum ether and then from aqueous methanol to yield 3-acetoxy-16-hydroxy-D-homo-5-pregnen-20-one melting at about 192–193° C. An 0.8% chloroform solution of this compound shows a specific rotation $[\alpha]_D = -31°$.

Example 5

To a solution of 300 parts of p-toluenesulfonyl chloride in 3000 parts of pyridine are added 265 parts of 3-acetoxy-16-hydroxy-D-homo-5-pregnen-20-one and the resulting solution is maintained in a closed nitrogen-filled vessel at 65° C. for 36 hours. Then ice is added and the crude product is removed by filtration. Successive crystallizations from aqueous methanol, from ether and petroleum ether, and again from aqueous methanol yield 3-acetoxy-16-p-toluenesulfonyloxy-D-homo-5-pregnen-20-one melting at about 173–174.5° C. The compound has the structural formula

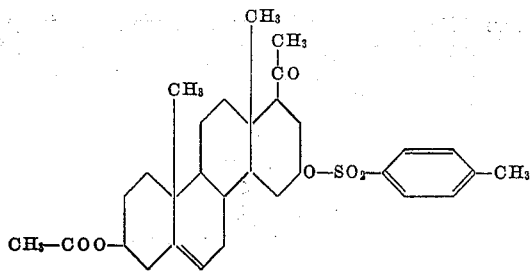

117 parts of this ester are refluxed for 80 minutes with 9200 parts of 2,4,6-collidine. The solution is then poured into 71,000 parts of ether and the ether solution is washed with dilute hydrochloric acid solution, with dilute sodium carbonate solution and with water. The ether solution is then dried and the solvent is distilled. The residue is crystallized from petroleum ether and then aqueous methanol to yield 3-acetoxy-D-homo-5,17-pregnadien-20-one melting at about 179–181° C.

Example 6

To a mixture of 370 parts of chromium trioxide in 15,000 parts of cold pyridine are added 370 parts of 3-acetoxy-16-hydroxy-D-homo-5-pregnen-20-one. The resulting solution is kept at room temperature for 24 hours and then poured into 150,000 parts of water. The resulting dark solution, which contains some suspended solid material, is extracted portionwise with a total of 400,000 parts of a mixture containing equal volumes of ether and benzene. The combined organic layers are washed with water, dried over sodium sulfate and distilled. The residue is crystallized successively from aqueous methanol, from ethyl acetate and petroleum ether and from ether and petroleum ether to yield 3-acetoxy-D-homo-5-pregnene-16,20-dione melting at about 166–168° C. The compound has the structural formula

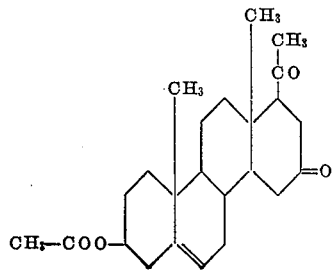

The infrared absorption spectrum shows absorption maxima at about 3.38, 5.78, 6.96, 7.31, 8.00 and 9.63 microns. It does not show the characteristic aldehyde absorption band in the neighborhood of 3.6 microns which confirms that the starting material is a D-homo-pregnen-16-ol rather than a 16-hydroxymethylpregnene derivative.

Example 7

To a solution of 1 part of 3,16-dihydroxy-D-homo-5-pregnen-20-one in a minimum of pyridine are added 2 parts of β-cyclopentanepropionyl chloride and the mixture is maintained at 25° C. for 36 hours. The mixture is then diluted with ether, washed successively with water, 5% aqueous sodium hydroxide, and again with water, dried over anhydrous calcium sulfate, filtered and evaporated to yield the 3,16-bis(β-cyclopentylpropionyloxy)-D-homo-5-pregnen-20-one which shows infrared maxima at 5.77, 5.90, 7.37, and a broad band at 8.00 to 8.17 microns. The compound has the structural formula

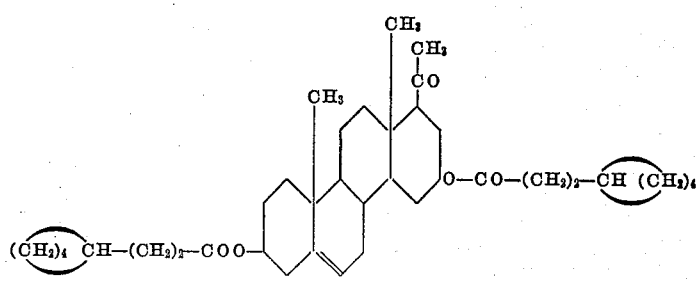

Example 8

Substitution of an equal amount of benzoyl chloride for the β-cyclopentanepropionyl chloride used in the preceding example yields the 3,16-dibenzoyloxy-D-homo-5-pregnen-20-one which shows infrared maxima at 5.81, 5.90, 7.36, and 7.80 microns. It has the structural formula

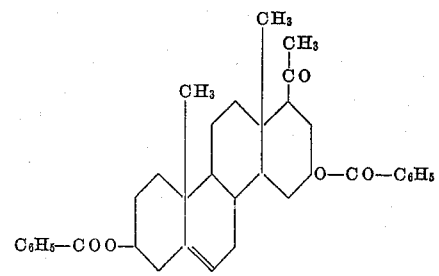

Example 9

An anhydrous solution of 5 parts of 3,16-dihydroxy-D-homo-5-pregnen-20-one in 500 parts of toluene is treated with 100 parts of cyclohexanone and a solution of 2.5 parts of aluminum isopropoxide in 100 parts of toluene. The mixture is heated under reflux for 30 minutes, cooled and then poured into 2500 parts of a saturated aqueous Rochelle salt solution. The organic layer is separated, dried over anhydrous sodium sulfate, filtered and concentrated to a small volume. The residue is then applied to a silica gel chromatography column. The column is washed with benzene and increasing concentrations of ethyl acetate in benzene. A solution of 40% of ethyl acetate in benzene elutes the 16-hydroxy-D-homo-4-pregnene-3,20-dione which is crystallized from a mixture of acetone and cyclohexane. The crystals thus obtained melt at about 206°–208° C. The compound has the structural formula.

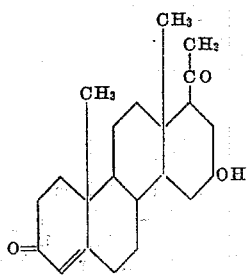

Example 10

A solution of 190 parts of 16-aminomethylprogesterone in 31 parts of acetic acid and 2000 parts of water is treated with a solution of 36 parts of sodium nitrite in 2500 parts of water. The mixture is heated on a steam bath for 2 hours and then cooled and the precipitate is collected on a filter, washed with water and dried. A benzene solution of this product is applied to a silica gel chromatography column which is eluted with increasing concentrations of ethyl acetate in benzene. A 40% solution of ethyl acetate in benzene gives an eluate which, on concentration, yields 16-hydroxy-D-homo-4-pregnene-3,20-dione. On recrystallization from acetone and cyclohexane, the crystals melt at about 207–209° C.

What is claimed is:

1. A member of the class consisting of 3,16-dihydroxy-D-homo-5-pregnen-20-one, 16 - hydroxy-D-homo-4-pregnene-3,20-dione and their esters of hydrocarbon carboxylic acids containing no more than 8 carbon atoms.
2. 3,16-dihydroxy-D-homo-5-pregnen-20-one.
3. A 3,16-di(lower alkanolyoxy)-D-homo-5-pregnen-20-one.
4. 3,16-diacetoxy-D-homo-5-pregnen-20-one.
5. A 3 - (lower alkanoyloxy) - 16 - hydroxy-D-homo-5-pregnen-20-one.
6. 3-acetoxy-16-hydroxy-D-homo-5-pregnen-20-one.
7. 16-hydroxy-D-homo-4-pregnene-3,20-dione.

8. The process of preparing a compound of the structural formula

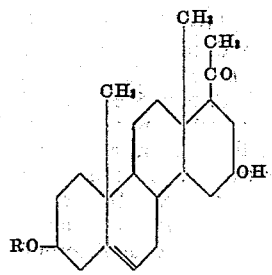

wherein R is a member of the class consisting of hydrogen and hydrocarbon-carbonyl radicals of no more than 8 carbon atoms which comprises heating of a compound of the structural formula

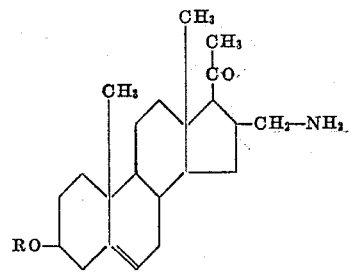

with nitrous acid.

9. The process of preparing 3,16-dihydroxy-D-homo-5-pregnen-20-one which comprises heating 3-hydroxy-16-aminomethyl-5-pregnen-20-one with nitrous acid.

10. The process of preparing a 3-(lower alkanoyloxy)-16-hydroxy-D-homo-5-pregnen-20-one which comprises heating a 3-(lower alkanoyloxy)-16-aminomethyl-5-pregnen-20-one with nitrous acid.

References Cited in the file of this patent

UNITED STATES PATENTS

| | | |
|---|---|---|
| 2,324,881 | Ruzicka et al. | July 20, 1943 |
| 2,351,637 | Ruzicka et al. | June 20, 1944 |
| 2,697,109 | Dodson | Dec. 14, 1954 |